Patented Oct. 9, 1945

2,386,659

UNITED STATES PATENT OFFICE 2,386,659

DIELECTRIC MATERIAL

Frank M. Clark, Pittsfield, Mass., assignor to General Electric Company, a corporation of New York No Drawing. Application November 8, 1941, Serial No. 418,426

4 Claims. (Cl. 252—63)

The present invention comprises dielectric material for use in capacitors, or like apparatus, which consists of a carrier of suitable stable plastic product in sheet form, for example, cellulose acetate or other cellulose plastic, or artificial resin, having as a novel feature a quantity of finely divided magnesium oxide incorporated therein.

In my prior U. S. Patent 2,307,488, patented January 5, 1943, I have described electric capacitors provided with thin dielectric spacers of cellulose acetate or the like. While cellulose acetate and other plastic products have advantages as dielectric materials, they also possess some disadvantages. The fact that they can be produced in extremely thin sheets capable of being wound into rolls is advantageous. The fact that they are impervious to impregnating liquids, however, is disadvantageous.

When capacitors containing spacers of cellulose acetate are treated with a liquid of higher dielectric constant, only the spaces or voids between the sheets are filled and the dielectric constant of the spacer itself remains unchanged. Hence, the capacity per unit volume of such capacitors is not so high as it might be if the spacers were porous. This is especially important when liquids such as pentachlor diphenyl (dielectric constant approx. 5) are used as the impregnant. The absorption of a high dielectric constant liquid by a porous spacer of low dielectric constant raises the dielectric constant of the treated assembly to an extent dependent on the absorptive power of the spacer.

It has been suggested to load spacers consisting of the impervious plastic substances with a finely divided solid material of high dielectric constant or with a high dielectric constant liquid or solid of an organic nature compatible with the plastic substance in order to obtain a sheet material of higher dielectric constant, but heretofore attempts to thus improve the dielectric constant of such sheet stock have resulted in an increase of the power factor of the completed sheet or film.

I have discovered that magnesium oxide, although it is not a material of outstandingly high dielectric constant, when employed as a filler will greatly enhance the dielectric constant of a sheet of plastic material, such as cellulose acetate. Unlike other finely divided solid materials which heretofore have been similarly added to such sheet material, magnesium oxide-loaded sheets of cellulose acetate or the like when used as spacers in capacitors operate with a low power factor as well as a high capacity. A sheet of cellulose acetate prepared as described in my former application has a dielectric constant of about 3.5. When about 5 to 15 per cent of magnesium oxide in finely divided form (approximately .05 to .1 mil in diameter) is well dispersed in the cellulose acetate while it is in the plastic state or in solution preparatory to being fabricated into films, then the dielectric constant of the resulting films is increased without sacrifice of desirable power factor and an improvement in breakdown strength. For example, the addition of 10 per cent magnesium oxide by weight results in a dielectric constant of 7. The addition of 15 per cent of magnesium oxide results in a dielectric constant of 9. Ordinarily for practical purposes the content of magnesium oxide is maintained at about 10 per cent by weight of the finished plastic sheet or film.

The fabrication of self-sustaining sheets from a cellulose acetate solution having magnesium oxide dispersed therein may be carried out by extrusion or by deposition as described in my former Patent 2,307,488. Briefly, the fabrication of the sheets may be carried out by preparing a solution of cellulose acetate which preferably has an acetylation of 38 to 41 per cent. The solution, in which magnesium oxide is to be suspended, may contain the following ingredients:

|  | Per cent |
| --- | --- |
| Cellulose acetate | 5.75 |
| Ethylene glycol monoethyl ether | 6.00 |
| Acetone | 88.25 |

The dielectric sheet is prepared by depositing a film on a continuous belt passing through the solution of the cellulose acetate. The film is dried and stripped from the belt. The detached sheets may be wound into rolls of desired width and length. The self-sustaining films thus prepared may have a thickness ranging from .0001, or even thinner, to .0003 inch. Sheets of other cellulose derivatives, such as ethyl cellulose, butyl cellulose, cellulose nitrate, as well as double esters, such as the butyl ethyl ether and cellulose ester acetate, may be similarly prepared.

Dielectric sheet material also may be prepared from suitable artificial resins such as alkyd resins and vinyl resins. Capacitors containing as spacing material several sheets of cellulose acetate having a thickness of .0002 inch, respectively with and without magnesium oxide, and treated as described in my former patent with pentachlor diphenyl, in each case have upon test shown the following characteristics at different temperatures:

| Temp. deg. C. | Capacity | | Power factor | |
|---|---|---|---|---|
| | No MgO | 10% MgO | No MgO | 10% MgO |
| 30 | 3.05 | 4.30 | .60 | .52 |
| 50 | 2.96 | 4.10 | .55 | .43 |
| 75 | 2.91 | 3.99 | .55 | .41 |
| 100 | 2.86 | 3.91 | .70 | .45 |

It will be observed that the power factor of the cellulose acetate spacers containing magnesium oxide is even lower than the power factor of cellulose acetate sheets devoid of dispersed magnesium oxide. It has been generally experienced that the addition of a "filler" to a thin sheet material (.002" or less) invariably increases the conducting particle count and gives lower dielectric breakdown. With my improved sheet this is not true. The conducting particle count for .0002" cellulose acetate sheet properly prepared ranges 10 or less per square foot with or without the magnesium oxide.

The average electric breakdown characteristics of sheet material are likewise unaffected by the presence of the magnesium oxide when prepared in accordance with my invention. When prepared in sheets .0002" thick, the dielectric strength of the unmodified sheet acetate ranges between 300 and 400 volts (1500 to 2000 volts per mil). Cellulose acetate sheets of similar thickness modified with 10 per cent magnesium oxide has been found to possess a dielectric strength ranging from 350 to 500 volts (1750 to 2500 volts per mil). The average dielectric strength obtained for comparable sheets of the unmodified cellulose acetate is 325 volts (1625 volts per mil). The average dielectric strength of the cellulose acetate sheets modified with 10 per cent magnesium oxide is 412 volts (2060 volts per mil).

In some cases it may be desirable to fabricate capacitors employing composite spacers consisting of one sheet of .0003 inch kraft paper placed between two sheets of .0002 inch cellulose acetate. The advantage of this arrangement is such that the paper will absorb readily an impregnating material, such as pentachlor diphenyl. This is especially advantageous in capacitors designed for voltage application at 600 volts and higher. The following tabulation will show the results of this combination at different temperatures both with and without magnesium oxide:

| Temp. deg. C. | Acetate+paper, percent power factor | Acetate+10% MgO+paper, percent power factor |
|---|---|---|
| 30 | .54 | .45 |
| 50 | .46 | .43 |
| 75 | .50 | .47 |
| 100 | .54 | .51 |

What I claim as new and desire to secure by Letters Patent of the United States is:

1. A capacitor dielectric detached sheet material consisting exclusively of cellulose acetate having about 5 to 15 per cent by weight of magnesium oxide dispersed therein.

2. A dielectric sheet material suitable for use in electric capacitors consisting of cellulose ester and having dispersed therein about five to fifteen percent of magnesium oxide by weight, said sheet material having a dielectric constant of about 7 to 9 and a power factor of about .5%, which is not unfavorably affected by rise of temperature from 30° to 100° C.

3. A capacitor dielectric material consisting of cellulose acetate in the form of detached sheets having a thickness of about .0001 to .0003 inch having uniformly dispersed therein a filler consisting solely of about ten per cent of finely divided magnesium oxide having a particle size of about .05 to .1 mil, said sheets having a dielectric strength of about 2060 volts per mil.

4. A dielectric sheet material having a thickness of about .0001 to .0003 inch which is suitable for use as a spacer in electric capacitors consisting of a cellulose ester containing about 5 to 15 per cent by weight of finely divided magnesium oxide dispersed therein unassociated with any other mineral material.

FRANK M. CLARK.